US009938019B2

(12) United States Patent
Floyd et al.

(10) Patent No.: US 9,938,019 B2
(45) Date of Patent: Apr. 10, 2018

(54) SYSTEMS AND METHODS FOR DETECTING A SECURITY BREACH IN AN AIRCRAFT NETWORK

(71) Applicant: The Boeing Company, Chicago, IL (US)

(72) Inventors: David H. Floyd, Kirkland, WA (US); Jason W. Shelton, Edgewood, WA (US); John E. Bush, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/718,820

(22) Filed: May 21, 2015

(65) Prior Publication Data

US 2016/0340055 A1    Nov. 24, 2016

(51) Int. Cl.
*B64D 45/00* (2006.01)
*H04L 29/08* (2006.01)
*H04L 29/06* (2006.01)
*H04W 4/04* (2009.01)

(52) U.S. Cl.
CPC .......... *B64D 45/0015* (2013.01); *H04L 63/14* (2013.01); *H04L 63/1441* (2013.01); *B64D 2045/0045* (2013.01); *H04L 67/12* (2013.01); *H04W 4/046* (2013.01)

(58) Field of Classification Search
CPC . H04L 63/1441; H04L 63/1425; H04L 67/12; H04L 63/1416; H04L 63/14; B64D 45/005; B64D 2045/0045; B64D 45/0015
USPC ...................................... 726/22-25
See application file for complete search history.

(56) References Cited

U.S. PATENT DOCUMENTS

| 8,793,787 B2* | 7/2014 | Ismael | G06F 21/566 726/1 |
| 9,369,484 B1* | 6/2016 | Lacerte | H04L 63/1441 |
| 2007/0113281 A1* | 5/2007 | Leach | G06Q 40/08 726/22 |
| 2008/0163354 A1* | 7/2008 | Ben-Shalom | H04L 63/1441 726/12 |
| 2013/0166271 A1* | 6/2013 | Danielsson | G06F 11/3664 703/22 |
| 2013/0227648 A1* | 8/2013 | Ricci | H04W 12/08 726/3 |
| 2014/0013431 A1* | 1/2014 | Bush | G06F 21/00 726/23 |

(Continued)

OTHER PUBLICATIONS

Airborne Network Security Simulator (ANSS) Master Plan Overview, Chris Riley, 2010.*

(Continued)

*Primary Examiner* — Shanto M Abedin
(74) *Attorney, Agent, or Firm* — MH2 Technology Law Group LLP

(57) ABSTRACT

A network system of an aircraft implements a target system to attract, detect, log, and mitigate a potential breach by the malicious entities. The target system simulates the systems of the aircraft in order to attract a potential breach. The target system simulates the data, file structure, communications, etc., of the systems of the aircraft. The target system includes little, or no security or access controls in order to attract a potential breach and allow the malicious entity to gain access. Once a breach occurs, the target system can be configured to log, report, and/or mitigate the potential breach.

15 Claims, 5 Drawing Sheets

(56) References Cited

U.S. PATENT DOCUMENTS

| | | | | |
|---|---|---|---|---|
| 2014/0096229 A1* | 4/2014 | Burns | ................. | H04L 63/1491 |
| | | | | 726/15 |
| 2014/0366139 A1* | 12/2014 | Khuti | .................... | G06F 21/552 |
| | | | | 726/24 |
| 2015/0150124 A1* | 5/2015 | Zhang | ................. | H04L 63/1408 |
| | | | | 726/22 |
| 2016/0057160 A1* | 2/2016 | Buehler | .............. | H04L 63/1416 |
| | | | | 726/23 |
| 2016/0188765 A1* | 6/2016 | Vossler | .............. | G06F 17/5009 |
| | | | | 703/8 |
| 2016/0188876 A1* | 6/2016 | Harris | ................. | G06N 99/005 |
| | | | | 726/23 |
| 2016/0285907 A1* | 9/2016 | Nguyen | ............. | H04L 63/1433 |
| 2016/0358497 A1* | 12/2016 | Nguyen | ............. | H04L 63/1433 |
| 2017/0019309 A1* | 1/2017 | Mason | ................... | G05B 17/02 |

OTHER PUBLICATIONS

Marko Wolf et al, Information Technology Security Threats to Modern e-Enabled Aircraft: A cautionary Note, Journal of Aerospace Information Systems, 2014.*

Krishna Sampigethaya et al, Future E-Enabled Aircraft Communications and Security: The Next 20 Years and Beyond, IEEE, 2011.*

Brian Hennessey et al, Security Simulation for Vulnerability Assessment, IEEE, 2007.*

\* cited by examiner

SYSTEMS AND METHODS FOR DETECTING A SECURITY BREACH IN AN AIRCRAFT NETWORK

BACKGROUND

Modern aircraft include a variety of electronic and computer systems to operate the aircraft and provide services to the passengers of the aircraft. Aircraft typically include a network system to allow the systems of the aircraft to communicate, provide services to the passengers, and communicate with off-board systems. The network, however, provides a conduit by which malicious entities, e.g., hackers, can attempt to gain unauthorized access to the aircraft. To prevent this, modern aircraft employ various security controls to prevent access to critical and sensitive systems.

The security controls, however, do not provide an effective and real-time means for detecting, analyzing, and tracking attempted breaches or attracting malicious entities. Conventional ground-based systems often include dedicated systems to detect and track breaches. The conventional ground-based systems are designed to work on large scale networks with thousands of network nodes running hundreds of network protocols. To service these large scale networks, the conventional ground-based systems are implemented on separate hardware appliances that require additional power, add additional weight, increase cost, and require additional space. These dedicated systems, however, are not suitable for aircraft due to size and computational requirements. There is therefore a need for methods and systems for detecting, analyzing, and tracking attempted breaches in aircraft.

SUMMARY

According to aspects of the present disclosure a system includes a network system on-board an aircraft, a plurality of aircraft systems coupled to the network system, and a target system coupled to the network system. The target system is configured to simulate operations of the plurality of aircraft systems. Also, the target system is configured to detect an attempted access of the target system.

According to additional aspects of the present disclosure, a method includes initiating a target system that communicates with a network system of an aircraft. The target system is configured to simulate operations of a plurality of aircraft systems of the aircraft. The target system is configured to detect an attempted access of the target system. The method also includes monitoring access to the target system and determining, based on the monitoring, that the attempted access of the target system has occurred. Further, the method includes logging the attempted access as an attempted breach of the plurality of aircraft systems.

According to additional aspects of the present disclosure, a non-transitory computer readable medium includes instructions for causing one or more processors to perform a method. The method includes initiating a target system that communicates with a network system of an aircraft. The target system is configured to simulate operations of a plurality of aircraft systems of the aircraft. The target system is configured to detect an attempted access of the target system. The method also includes monitoring access to the target system and determining, based on the monitoring, that the attempted access of the target system has occurred. Further, the method includes logging the attempted access as an attempted breach of the plurality of aircraft systems.

DETAILED DESCRIPTION

For simplicity and illustrative purposes, the principles of the present disclosure are described by referring mainly to examples of various implementations thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific examples of various implementations. Logical and structural changes can be made to the examples of the various implementations without departing from the spirit and scope of the present disclosure. The following detailed description is, therefore, not to be taken in a limiting sense and the scope of the present disclosure is defined by the appended claims and their equivalents.

According to aspects of the present disclosure, on-board systems of an aircraft can be configured to implement a target system to attract, detect, log, and mitigate a potential breach by malicious entities. To minimize the size, weight, power, and space impact, the target system can be implemented on the existing computer systems of the aircraft, e.g. on-board network hardware and/or software. The target system can be configured to simulate the systems and operations of the systems of the aircraft in order to attract a potential breach. To mimic the aircraft systems, the target system simulates the data, file structure, communications, etc., of the systems of the aircraft. The target system can be configured to include little or no security or access controls in order to attract a potential breach and allow the malicious entity to gain access. Once a breach occurs, the target system can be configured to log, report, and/or mitigate the potential breach.

By utilizing the existing computer systems of the aircraft, the target system can detect and mitigate potential security breaches without adding additional components to the aircraft. As such, the constraints of size, weight, and power in the aircraft can be maintained while providing real-time detection and mitigation of potential security breaches. Moreover, by utilizing the existing computer systems of the aircraft, the target system can be specifically tailored to the unique operating environments of an aircraft (e.g. vibration, power input EMI acceptability.)

Figure 1:
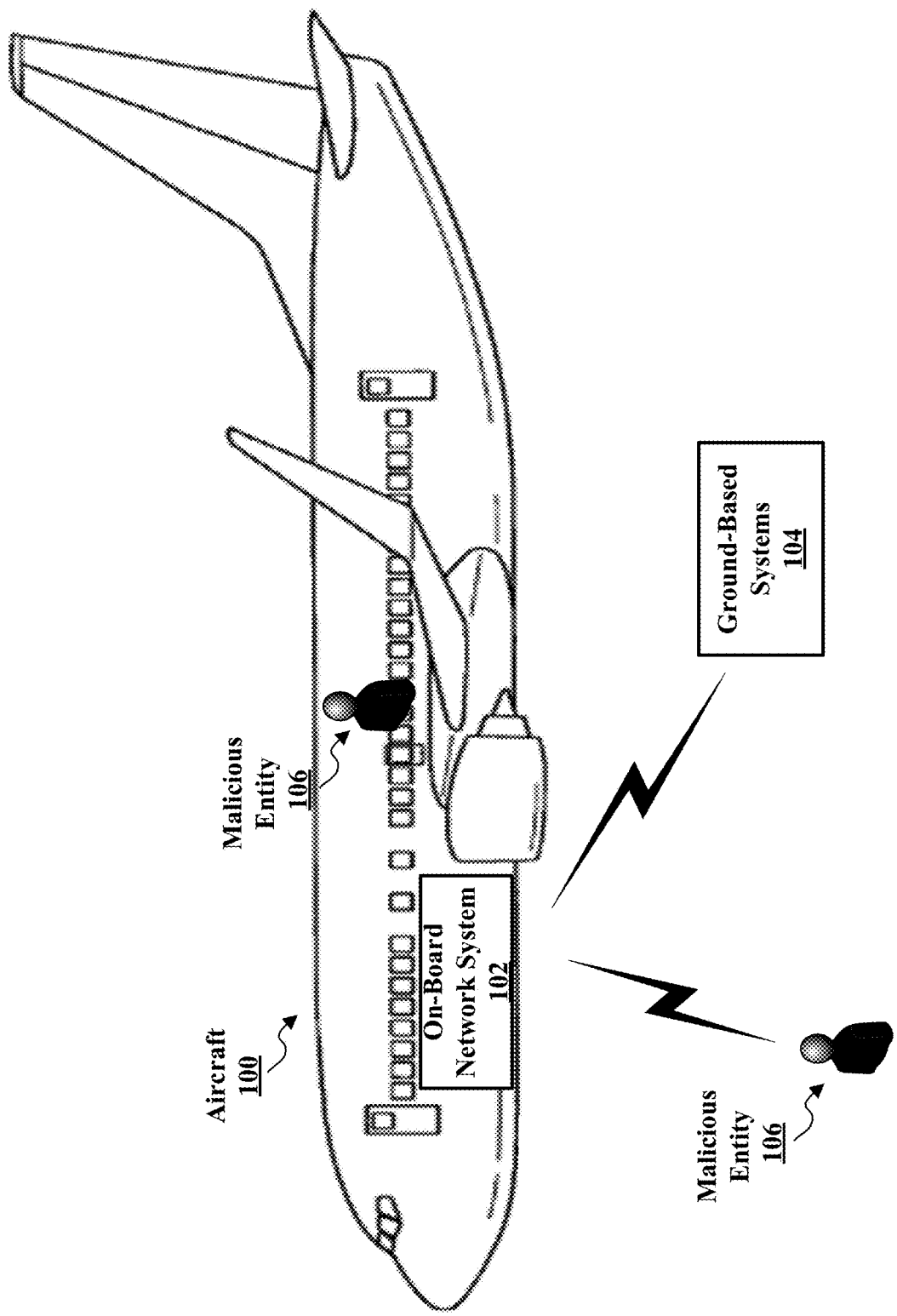
FIG. 1 illustrates an example of systems of an aircraft, according to various aspects of the present disclosure.

FIG. 1 illustrates an aircraft 100, according to aspects of the present disclosure. While FIG. 1 illustrates various components contained in the aircraft 100, FIG. 1 illustrates one example of an aircraft and additional components can be added and existing components can be removed.

As illustrated in FIG. 1, the aircraft 100 can include an on-board network system 102. The on-board network system 102 can be configured to control the communications with the on-board systems of the aircraft 100, for example, flight control systems, safety systems, communications systems, etc. The on-board network system 102 can also be configured to control the communications with the aircraft 100 and the ground-based systems 104, for example, air traffic control, ground control systems, ground-based airline personnel, etc.

As illustrated, a malicious entity 106 may desire to attack the systems of the aircraft 100 and/or the ground-based systems 104 via the aircraft 100. As described herein, the malicious entity 106 can be any type of person, computer system, or computer software that may attempt an unauthorized access of the systems of the aircraft 100 and/or the ground-based systems 104 via the aircraft 100. For example, the malicious entity 106 can be a passenger on the aircraft attempting to gain unauthorized access to the systems of the aircraft 100 and/or the ground-based systems 104. Likewise, the malicious entity 106 can be a person, computer system, or computer software attempting to remotely gain unauthorized access to the systems of the aircraft 100 and/or the ground-based systems 104 via a communication link. As described herein, an unauthorized access can include any type of attempted access or usage of the systems of the aircraft 100 and/or the ground-based systems 104 by entities not associated with or authorized to use the systems. For example, an unauthorized access can include an attempt to "hack" the systems of the aircraft 100 and/or the ground-based systems 104, an attempt to steal information from the systems of the aircraft 100 and/or the ground-based systems 104, an attempt to download malicious software to the systems of the aircraft 100 and/or the ground-based systems 104, and the like.

According to aspects of the present disclosure, the on-board network system 102 can be configured to implement a target system to attract, detect, log, and mitigate a potential breach by the malicious entities 106. The target system can be configured to simulate the systems of the aircraft 100 in order to attract a potential breach. The target system can be configured to simulate the operation of the systems of the aircraft 100. That is, the target system simulates the data, file structure, communications, etc., of the systems of the aircraft 100. The target system can be configured to include little or no security or access controls in order to attract a potential breach and allow the malicious entity 106 to gain access. Once a breach occurs, the target system can be configured to log, report, and/or mitigate the potential breach.

In aspects, software supporting target system can be installed on the on-board network system 102. Likewise, in aspects, the hardware and existing software of the on-board network system 102 can be modified and updated to support the target system. In some aspects, the target system can be supported by and implemented in other existing software and/or hardware of the aircraft 100.

By implementing a target system with the existing systems in the aircraft, potential security breaches can be identified and logged in-real time without adding large and computationally expensive detection system. By identifying the threats in real-time, operators of the aircraft can be notified as breaches occur so that mitigation can be performed before critical systems are breached. Additionally, by simulating the systems of the aircraft, the potential security breaches can be identified and logged without exposing the real systems of the aircraft to potential malicious entities.

Figure 2:
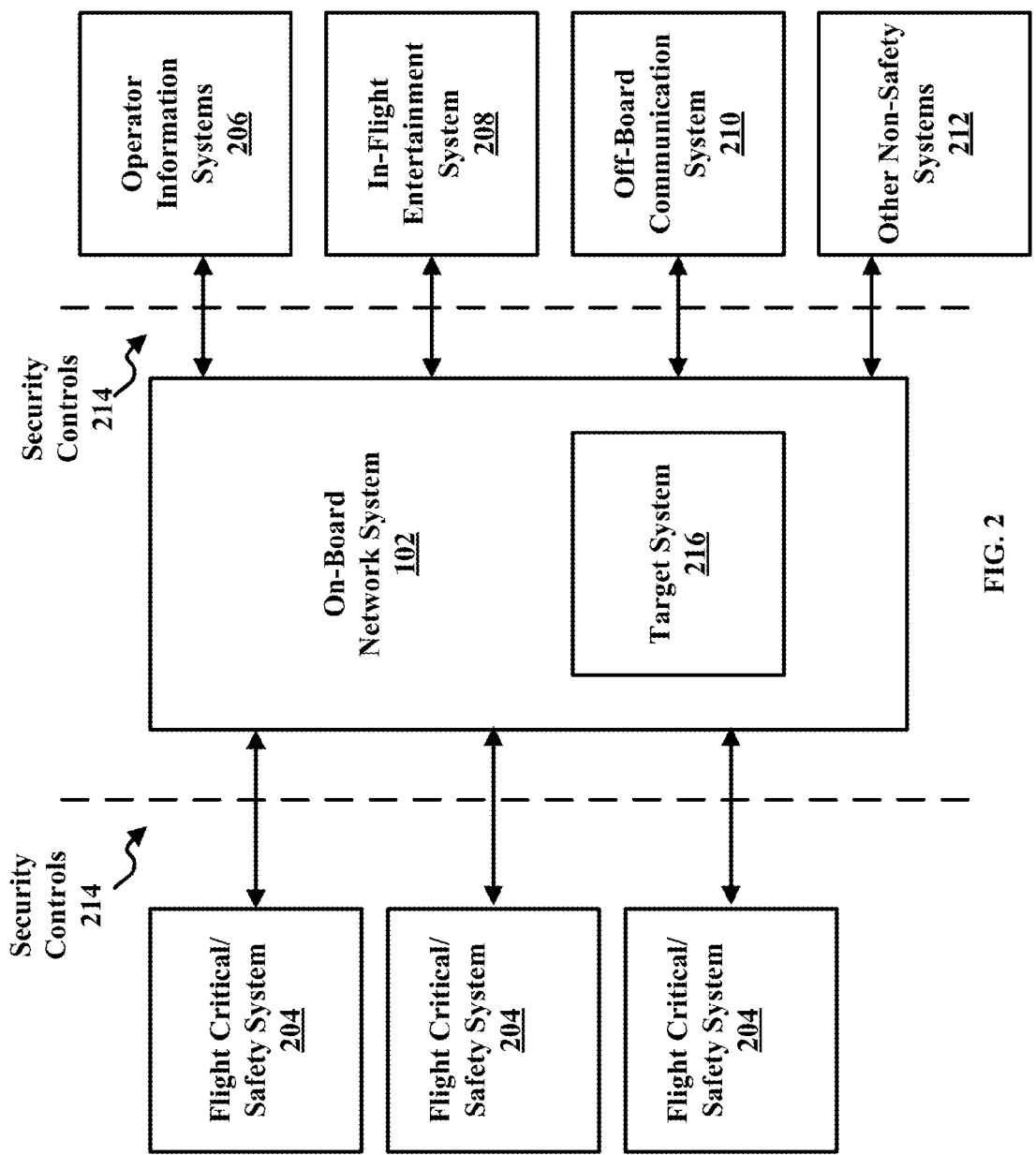
FIG. 2 illustrates an example of an on-board network system and connected aircraft systems, according to various aspects of the present disclosure.

FIG. 2 illustrates an example of the on-board network system 102, according to various aspects of the present disclosure. While FIG. 2 illustrates various components contained in the on-board network system 102, FIG. 2 illustrates one example of an on-board network system and additional components can be added and existing components can be removed.

As illustrated in FIG. 2, the on-board network system 102 can be connected to the various systems of an aircraft, for example, aircraft 100. The systems can include, for example, flight critical/safety systems 204, operator information system 206, in-flight entertainment system 208, off-board communication system 210, and other non-safety systems 212. The on-board network system 102 can be configured to control and manage the communications between the systems of the aircraft 100. The on-board network system 102 can be coupled to the system of the aircraft 100 by one or more networks. The one or more networks can include connections such as wired communications links, wireless communications links, optical communications links, and other suitable types of connections. While FIG. 2 illustrates several systems that can be included in an aircraft, the on-board network system 102 can be configured to communicate with any type of system conventionally found in an aircraft.

According to aspects, the systems of the aircraft 100 can include data that is critical to the operation of the aircraft 100 and perform operations that are critical to the operation of the aircraft 100. For example, the flight critical/safety systems 204 can be configured to control the operation and safety of the aircraft 100. The operator information systems 206 can be configured to collect and communicate information that represents the status and operation of the aircraft 100. The off-board communication system 210 can be configured to facilitate communication with the ground-based systems 104, for example, air traffic control. Likewise, the systems of the aircraft 100 can include sensitive information that must be securely maintained. For example, the in-flight entertainment system 208 can store and maintain passenger information, for example, credit card data, passenger personal information, etc.

To protect the systems of the aircraft 100, the on-board network system 102 can be configured to implement one or more security controls 214. The security controls 214 can be any type of conventional access controls and security layers to protect the systems of the aircraft 100. For example, the security controls 214 can include firewalls, access control policies, encryption, etc. to protect access to and communications to/from the systems of the aircraft 100.

According to aspects of the present disclosure, the on-board network system 102 can also be configured to implement a target system 216. The target system 216 can be configured as virtualized system that simulates the real systems of the aircraft 100, for example, the flight critical/safety systems 204, the operator information system 206, the in-flight entertainment system 208, the off-board communication system 210, and the other non-safety systems 212. The target system 216 can be configured to attract the malicious entities 106 attempting to breach the systems of the aircraft 100. The target system 216 can be configured to record, report and/or mitigate these attempted breaches.

In some aspects, as illustrated in FIG. 2, the target system 216 can be implemented as a virtual machine hosted on the on-board network system 102. As described herein, the virtual machine implementing the target system 216 can be any software implementation of a machine or computer that can execute a program or application using underlying hardware of the on-board network system 102. The virtual machine can be a system virtual machine capable of executing a complete operating system (OS) or process virtual machine capable of executing one or more programs or applications. It should be appreciated that the number, type, functionality, and extent of each of the virtual machine can vary based on the underlying hardware of the on-board network system 102, any requirements, or other factors. The on-board network system 102 can also include a virtualization manager to manage the virtual machine running the target system 216. The virtualization manager can be a software entity, application, module, application programming interface (API), or any component or combination of hardware resources, that can be configured to build, scale, instantiate, manage, and/or otherwise interface with a network of physical and virtual machines.

In aspects, software supporting target system 216 (e.g. virtual machine) can be installed on the on-board network system 102. Likewise, in aspects, the hardware and existing software of the on-board network system 102 can be modified and updated to support the target system. For example, the software supporting the target system 216 can be stored in a partitioned and/or secure location in memory of the on-board network system 102 in order to isolate the target system 216 for the other functions of the on-board network system 102. The hardware and/or software of the on-board network system 102 can be modified and updated to execute, instantiate, and run the target system 216 to perform the processes described herein.

In some aspects, the target system 216 can be configured to generate and simulate the systems of the aircraft 100. For example, the on-board network system 102 may include limited industrial control systems utilizing a network protocol such as Ethernet. Additionally, the systems of the aircraft 100, communicating with the on-board network system 102, may utilize tailored operating systems and specialized protocols. In aspects, the software and/or hardware supporting the target system 216 can be configured to interface with and simulate the operating system and specialized protocols of the aircraft 100.

The target system 216 can be configured to generate and simulate the systems of the aircraft so that the target system 216 appears as the real systems of the aircraft 100. For example, the target system 216 can be configured to simulate one or more of the flight critical/safety systems 204, the operator information system 206, the in-flight entertainment system 208, the off-board communication system 210, and the other non-safety systems 212. The target system 216 can be configured to implement and simulate communications, file structure, data typically generated and stored by the flight critical/safety systems 204, the operator information system 206, the in-flight entertainment system 208, the off-board communication system 210, and the other non-safety systems 212. For example, the target system 216 can generate and simulate data that represents: operation and safety of the aircraft 100: flight control data, engine data, flight plan, environment data, safety system configuration files, autopilot data, etc.; network data for the aircraft 100: network system configuration files, network communication protocols, security log files, etc.; operator information of the aircraft 100: altitude, airspeed, air traffic control data, etc.; and other data or files of the aircraft 100: passenger information, credit card data, multimedia files, etc.

In some aspects, the target system 216 can be configured to completely simulate the systems of the aircraft 100. For example, the target system 216 can store data, parameters, and logic that allow the target system 216 to completely simulate the systems of the aircraft 100. In some aspects, the target system 216 can be configured to utilize data from the systems of the aircraft 100 to simulate the systems of the aircraft 100. For example, the target system 216 can receive data from systems of the aircraft 100, such as flight plan and flight information, to more accurately simulate the operation of the systems of the aircraft 100.

In some aspects, the target system 216 can be configured to detect an attempt access or breach of the target system. Because the systems simulated by the target system 216 are not intended to be accessed or receive communications, the target system 216 can determine that any attempted access is an attempted breach. To determine an attempted access, the target system 216 can monitor the network ports, communication channels, busses, and access points simulated by the target system 216. If the target system detects an attempted access, the target system 216 can classify the attempted access as a breach.

In some aspects, the target system 216 can log an attempted breach. The target system 216 can be configured to gather and store information that is representative of the breach. The information can include, for example, data identifying the entity attempting the breach (network address, source of the access, details of the entity's systems, etc.), data identifying the breach (simulated systems attempted access, time of the access, duration of the access, etc.), and the like.

In some aspects, the target system 216 can report the attempted breach to personnel associated with the aircraft 100. For example, the target system 216 can report the attempted breach to the flight crew of the aircraft 100 and ground personnel at the ground-based systems 104. The target system 216 can report the attempted breach in real-time and/or at predetermined intervals (e.g. end of file, periodically, etc.). The target system 216 can be configured to report the information logged during the attempted breach.

Figure 3:
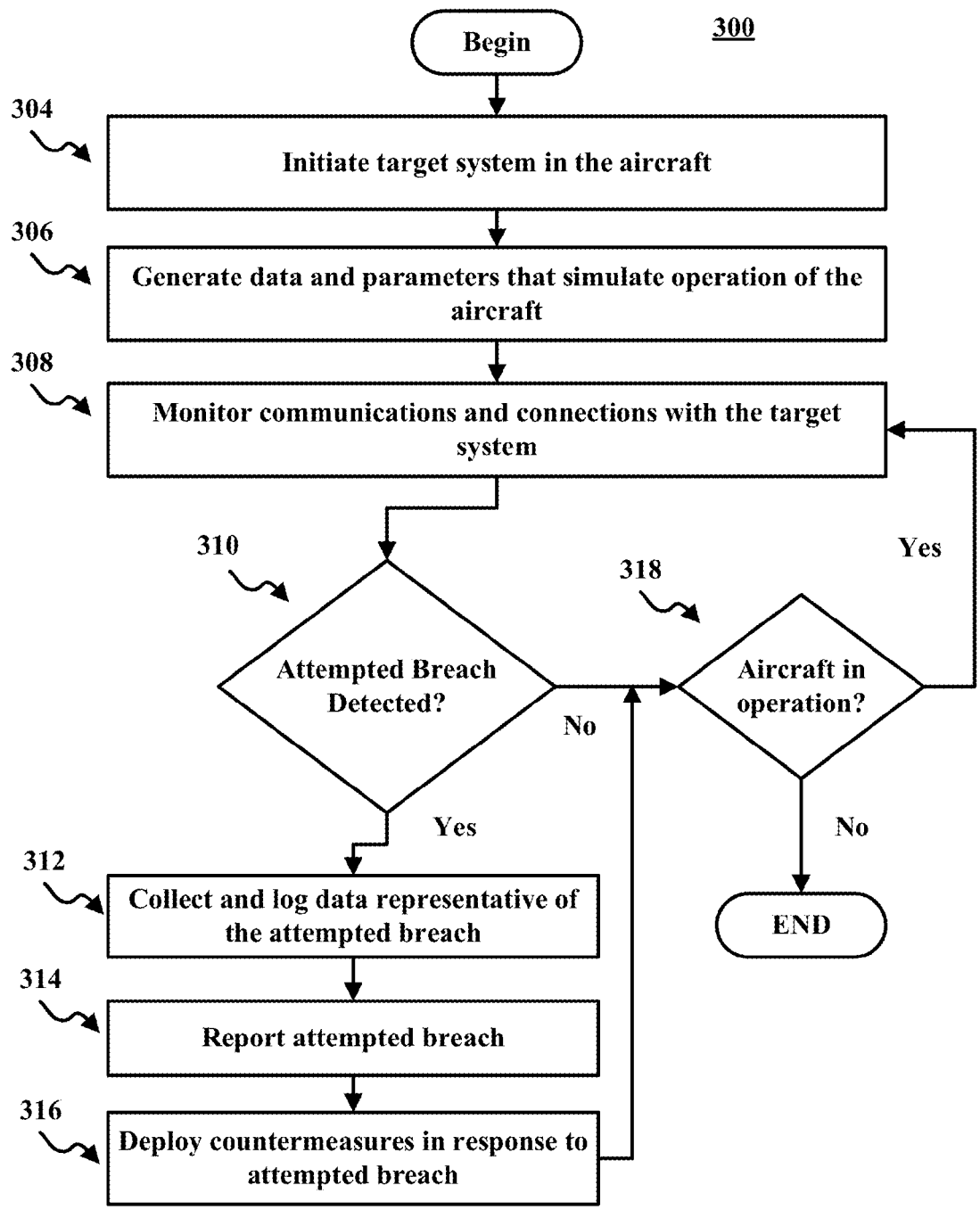
FIG. 3 illustrates an example of a process of detecting a breach of aircraft systems, according to various aspects of the present disclosure.

FIG. 3 illustrates one example of a process for detecting a breach using a target system, according to aspect of the present disclosure. While FIG. 3 illustrates various stages that can be performed, stages can be removed and additional stages can be added. Likewise, the order of the illustrated stages can be performed in any order.

The process begins at 300. After the process begins, in 304, the target system can be initiated in the aircraft. For example, in some aspects, when the aircraft 100, the on-board network system 102 can instantiate a virtual machine to operate the target system 216. Once the virtual machine is instantiated, the on-board network system 102 can initiate software in the virtual machine that simulates the system of the aircraft 100.

In 306, the target system can generate parameters that simulate the operation of the aircraft. For example, the target system 216 can be configured to generate and simulate the systems of the aircraft so that the target system 216 appears as the real systems of the aircraft 100. For example, the target system 216 can be configured to simulate one or more of the flight critical/safety systems 204, the operator information system 206, the in-flight entertainment system 208, the off-board communication system 210, and the other non-safety systems 212. The target system 216 can be configured to implement and simulate communications, file structure, data typically generated and stored by the flight critical/safety systems 204, the operator information system 206, the in-flight entertainment system 208, the off-board communication system 210, and the other non-safety systems 212.

In some aspects, the target system 216 can be configured to completely simulate the systems of the aircraft 100. For example, the target system 216 can store data, parameters, and logic that allow the target system 216 to completely simulate the systems of the aircraft 100. In some aspects, the target system 216 can be configured to utilize data from the systems of the aircraft 100 to simulate the systems of the aircraft 100. For example, the target system 216 can receive data from systems of the aircraft 100, such as flight plan and flight information, to more accurately simulate the operation of the systems of the aircraft 100.

In 308, the target system can monitor communication and connections with the target system. For example, the target system 216 can monitor all available access points to the target system 216, e.g., network ports, physical connections, virtual buses, etc.

In 310, the target system can detect an attempted breach of the target system. For example, because the target system is a simulated system, the target system can determine that no communication should be occurring with the target system. If the target system 216 detects an attempted connection or communication with the target system, the target system 216 can determine that this is an attempted breach.

In 312, if an attempted breach is detected, the target system can collect and log data representative of the attempted breach. The target system 216 can be configured to gather and store information that is representative of the breach. The information can include, for example, data identifying the entity attempting the breach (network address, source of the access, details of the entity's systems, etc.), data identifying the breach (simulated systems attempted access, time of the access, duration of the access, etc.), and the like.

In 314, the target system can report the attempted breach. For example, the target system 216 can report the attempted breach to the flight crew of the aircraft 100 and ground personnel at the ground-based systems 104.

In some aspects, the target system 216 can report, in real-time, all attempted breaches to personal and systems associated with the aircraft 100. For example, the target system 216 can send an alert to the flight crew of the aircraft 100 and/or the ground-based systems 104. The alert can include to data that was log representative of the attempted breach.

In some aspects, the target system 216 can rank the threat potential threat of the breach and selective report the attempt breach based on which of the system of the aircraft was attempted to be breached. For example, the attempted breach targets a flight critical/safety system 204, the target system 216 can determine that the attempted breach is a threat to the aircraft 100. In this example, the target system 216 can report the breach to the flight crew of the aircraft 100 and/or the ground-based systems 104. This allows the flight crew and or ground-based systems to take appropriate measures to prevent damage to the aircraft 100.

In 316, the target system can deploy countermeasures in response to the attempted breach. For example, the target system 216 can implement additional security control or enhance the security controls 214 in response to an attempted breach.

In 318, the target system can continue monitoring and detecting attempted breaches until operation of the aircraft ends. For example, the target system 216 can continue monitoring and detecting attempted breaches while the aircraft 100 is in operations.

Figure 4:
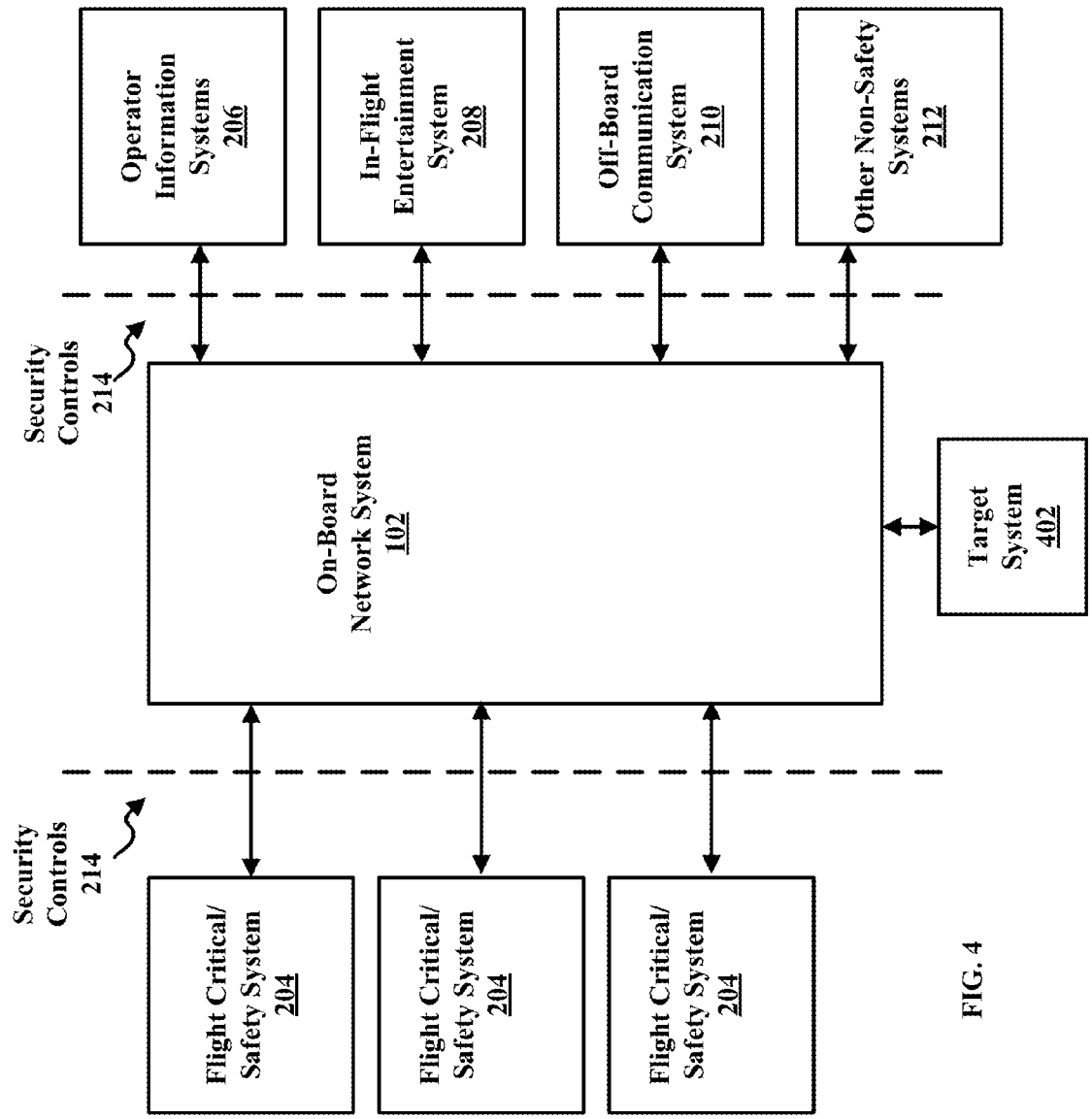
FIG. 4 illustrates another example of an on-board network system and connected aircraft systems, according to various aspects of the present disclosure.

As described above, the target system 216 can be implemented in a virtual machine hosted by the on-board network system 102. In some implementations, the target system can be implemented as a standalone system connected to the on-board network system 102. FIG. 4 illustrates another example of the on-board network system 102, according to various aspects of the present disclosure. While FIG. 4 illustrates various components contained in the on-board network system 102, FIG. 4 illustrates one example of an on-board network system and additional components can be added and existing components can be removed.

As illustrated, the on-board network system 102 can be connected to a target system 402 that is separate from the on-board network system 102. The target system 402 can include all the necessary hardware and/or software to perform the processes described above. The target system 402 can be connected to the network provided by the on-board network system 102 to appear as the actual systems of the aircraft 100. For example, to comply with the constraints of space, size, and power, the target system 402 can be implemented in hardware and/or software that is typically found in the aircraft 100. In aspects, the software and/or hardware supporting the target system 216 can be configured to interface with and simulate the operating system and specialized protocols of the aircraft 100.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 5:
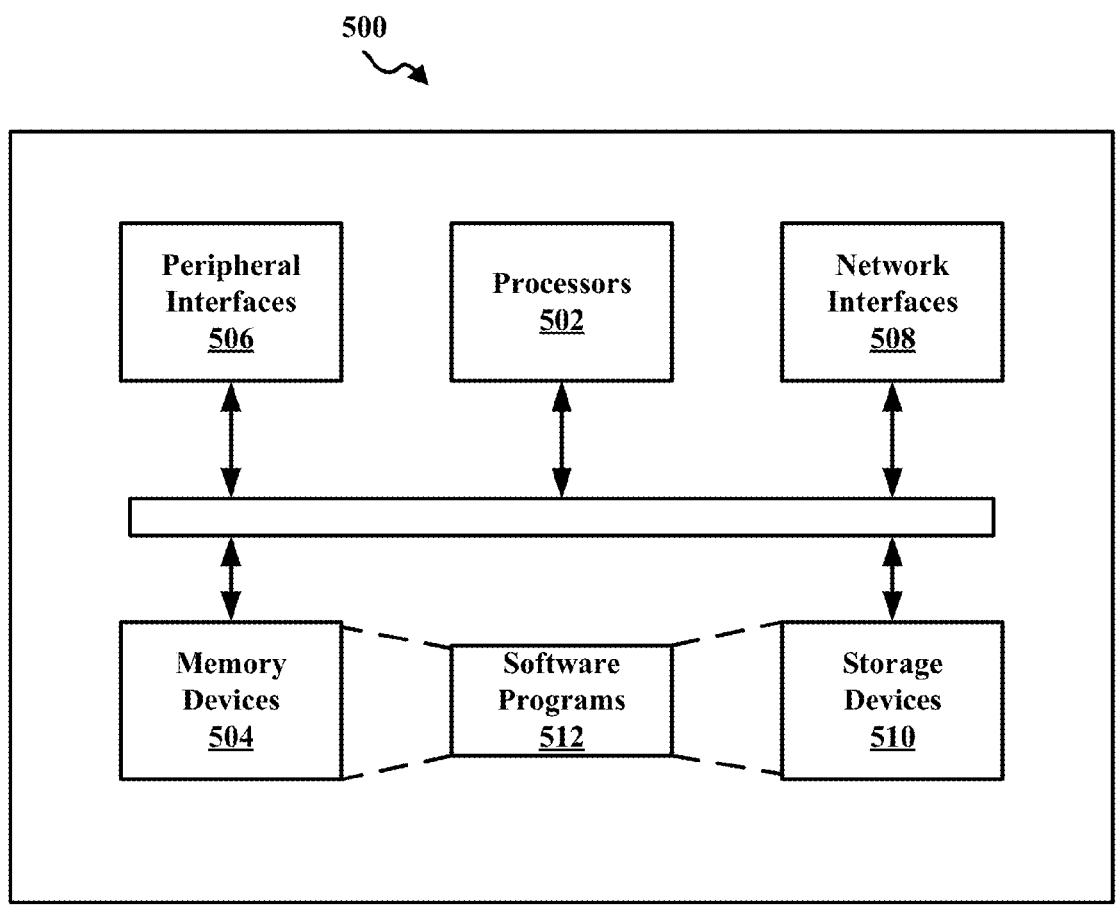
FIG. 5 illustrates an example of a hardware configuration for a computer device, according to various aspects of the present disclosure.

For example, FIG. 5 illustrates an example of a hardware configuration for the on-board network system 102, target system 216, and/or target system 402. While FIG. 5 illustrates various components contained in the computer device 500, FIG. 5 illustrates one example of a computer device and additional components can be added and existing components can be removed.

The computer device 500 can be any type of computer device. As illustrated in FIG. 5, the computer device 500 can include one or more processors 502 of varying core configurations and clock frequencies. The computer device 500 can also include one or more memory devices 504 that serve as a main memory during the operation of the computer device 500. For example, during operation, a copy of the software that supports the target system can be stored in the one or more memory devices 504. The computer device 500 can also include one or more peripheral interfaces 506, such as keyboards, mice, touchpads, computer screens, touchscreens, etc., for enabling human interaction with and manipulation of the computer device 500.

The computer device 500 can also include one or more network interfaces 508 for communicating via one or more networks, such as Ethernet adapters, wireless transceivers, or serial network components, for communicating over wired or wireless media using protocols. The computer device 500 can also include one or more storage device 510 of varying physical dimensions and storage capacities, such as flash drives, hard drives, random access memory, etc., for storing data, such as images, files, and program instructions for execution by the one or more processors 502.

Additionally, the computer device 500 can include one or more software programs 512 that enable the functionality of the target system described above. The one or more software programs 512 can include instructions that cause the one or more processors 502 to perform the processes described herein. Copies of the one or more software programs 512 can be stored in the one or more memory devices 504 and/or on in the one or more storage devices 510. Likewise, the data, for example, data for the systems of the aircraft 100, utilized by one or more software programs 512 can be stored in the one or more memory devices 504 and/or on in the one or more storage devices 510.

The computer device 500 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 500 as described above need not be enclosed within a single enclosure or even located in close proximity to one another. Those skilled in the art will appreciate that the above-described componentry are examples only, as the computer device 500 can include any type of hardware componentry, including any necessary accompanying firmware or software, for performing the disclosed implementations. The computer device 500 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While aspects have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

What is claimed is:

1. A system, comprising:
  a network system comprising a hardware electronic processor on-board an aircraft;
  a plurality of aircraft systems on-board the aircraft and comprising a hardware electronic processor coupled to the network system; and
  a target system comprising a hardware electronic processor coupled to the network system, wherein the target system is implemented in at least one of:
    the network system on-board the aircraft, or
    one or more of the plurality of aircraft systems on-board the aircraft;
  wherein the target system comprises a virtual machine instantiated on the network system and is configured to simulate data, file structure, communications, and operations of the plurality of aircraft systems, wherein the plurality of aircraft systems comprises flight systems, operator information systems, an in-flight entertainment system, and an off-board communication system, and wherein the target system is configured to detect an attempted access of the target system;

monitoring access to the target system;

determining, based on the monitoring, that the attempted access of the target system has occurred; and logging the attempted access as an attempted breach of the plurality of aircraft systems.

2. The system of claim 1, wherein the network system is configured to implement security controls to prevent access to the plurality of aircraft systems, and wherein access to the target system is not controlled by the security controls.

3. The system of claim 2, wherein the target system is configured to alter the security controls in response to the attempted access.

4. The system of claim 1 further comprising:

one or more memory device that are configured to store data representing the attempted access of the target system, wherein the data comprises a network address of an entity attempting access, one or more simulated aircraft systems which were attempted to be accessed, or a time of the attempted access.

5. The system of claim 1, wherein the target system is configured to report the attempted access to an entity associated with the aircraft.

6. A method, comprising:

initiating a target system that communicates with a network system of an aircraft, simulating, by the target system, operations of a plurality of aircraft systems on-board the aircraft, wherein the target system is implemented in at least one of:

the network system on-board the aircraft, or one or more of the plurality of aircraft systems on-board the aircraft, and wherein the target system comprises a virtual machine instantiated on the network system and is configured to simulate data, file structure, communications, and operations of the plurality of aircraft systems, wherein the plurality of aircraft systems comprises flight systems, operator information systems, an in-flight entertainment system, and an off-board communication system; and wherein the target system is configured to detect an attempted access of the target system;

monitoring access to the target system;

determining, based on the monitoring, that the attempted access of the target system has occurred; and logging the attempted access as an attempted breach of the plurality of aircraft systems.

7. The method of claim 6, the method further comprising: reporting the attempted breach to an entity associated with the aircraft.

8. The method of claim 6, the method further comprising: determining that the attempted breach targeted a critical system of the plurality of aircraft systems; and reporting the attempted breach based on the attempted breach targeted the critical system.

9. The method of claim 6, the method further comprising: altering security controls of the network system based on detecting the attempted breach.

10. The method of claim 6, wherein logging the attempted access comprises:

storing data representing the attempted access of the target system, wherein the data comprises a network address of an entity attempting access, one or more simulated aircraft systems which were attempted to be accessed, or a time of the attempted access.

11. A non-transitory computer readable medium comprising instructions for causing one or more processors to perform a method, the method comprising:

initiating a target system that communicates with a network system of an aircraft, simulating, by the target system, operations of a plurality of aircraft systems on-board the aircraft, wherein the target system is implemented in at least one of:

the network system on-board the aircraft, or one or more of the plurality of aircraft systems on-board the aircraft, and wherein the target system comprises a virtual machine instantiated on the network system and is configured to simulate data, file structure, communications, and operations of the plurality of aircraft systems, wherein the plurality of aircraft systems comprises flight systems, operator information systems, an in-flight entertainment system, and an off-board communication system; and wherein the target system is configured to detect an attempted access of the target system;

monitoring access to the target system;

determining, based on the monitoring, that the attempted access of the target system has occurred; and logging the attempted access as an attempted breach of the plurality of aircraft systems.

12. The non-transitory computer readable medium of claim 11, the method further comprising:

reporting the attempted breach to an entity associated with the aircraft.

13. The non-transitory computer readable medium of claim 11, the method further comprising:

determining that the attempted breach targeted a critical system of the plurality of aircraft systems; and reporting the attempted breach based on the attempted breach targeted the critical system.

14. The non-transitory computer readable medium of claim 11, the method further comprising:

altering security controls of the network system based on detecting the attempted breach.

15. The non-transitory computer readable medium of claim 11, wherein logging the attempted access comprises:

storing data representing the attempted access of the target system, wherein the data comprises a network address of an entity attempting access, one or more simulated aircraft systems which were attempted to be accessed, or a time of the attempted access.

* * * * *